US008508543B2

(12) United States Patent
Lu et al.

(10) Patent No.: US 8,508,543 B2
(45) Date of Patent: Aug. 13, 2013

(54) LAYERED TEXTURE COMPRESSION ARCHITECTURE

(75) Inventors: Yan Lu, Beijing (CN); John Tardif, Sammamish, WA (US); Matt Bronder, Bellevue, WA (US); Huifeng Shen, Beijing (CN); Feng Wu, Beijing (CN); Shipeng Li, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1456 days.

(21) Appl. No.: 12/141,094

(22) Filed: Jun. 18, 2008

(65) Prior Publication Data
US 2009/0315905 A1 Dec. 24, 2009

(51) Int. Cl.
*G06T 11/40* (2006.01)
*G09G 5/00* (2006.01)
*G06K 9/60* (2006.01)

(52) U.S. Cl.
USPC ........... 345/552; 345/582; 345/583; 345/584; 345/585; 345/586; 345/587; 345/588; 382/305

(58) Field of Classification Search
None
See application file for complete search history.

(56) References Cited

U.S. PATENT DOCUMENTS

| | | | |
|---|---|---|---|
| 5,808,621 A | 9/1998 | Sundaresan | |
| 6,130,680 A * | 10/2000 | Cox et al. | 345/544 |
| 6,768,493 B1 | 7/2004 | Donovan | |
| 6,850,243 B1 | 2/2005 | Kilgariff et al. | |
| 6,940,511 B2 | 9/2005 | Akenine-Moller et al. | |
| 6,959,110 B1 | 10/2005 | Danskin et al. | |
| 7,171,051 B1 | 1/2007 | Moreton et al. | |
| 7,385,611 B1 * | 6/2008 | Toksvig et al. | 345/582 |
| 7,554,563 B2 * | 6/2009 | Jeong | 345/636 |
| 7,714,873 B2 * | 5/2010 | Flavell et al. | 345/582 |
| 8,031,937 B2 * | 10/2011 | Rasmusson et al. | 382/166 |
| 2005/0024376 A1 * | 2/2005 | Gettman et al. | 345/582 |
| 2005/0063596 A1 * | 3/2005 | Yomdin et al. | 382/232 |
| 2006/0092167 A1 | 5/2006 | Wetzel | |
| 2006/0250408 A1 | 11/2006 | Xu | |
| 2008/0002896 A1 | 1/2008 | Lu et al. | |
| 2008/0122860 A1 | 5/2008 | Amann et al. | |

OTHER PUBLICATIONS

J.M.P. van Waveren, Real-Time Texture Streaming & Decompression, Nov. 11, 2006, retrieved from http://software.intel.com/sites/default/files/m/4/b/7/b/b/17248-real-time__20texture__20streaming__20__20decompression.pdf.*

Bajaj, et al. "Compression-Based 3D Texture Mapping for Real-Time Rendering", vol. 62 , Issue 6 (Nov. 2000) Pacific Graphics '99 in Graphical Models. Pages: 391-410.

Linz, et al. "Effective Multi-Resolution Rendering and Texture Compression for Captured Volumetric Trees", Eurographics Workshop on Natural Phenomena (2006). 8 Pages.

Pasman, et al. "Latency Layered Rendering for Mobile Augmented Reality", Proceedings 21st Symposium on Information Theory, Date: 2001, 13 Pages.

(Continued)

*Primary Examiner* — Kee M Tung
*Assistant Examiner* — Haixia Du

(57) ABSTRACT

Various technologies for a layered texture compression architecture. In one implementation, the layered texture compression architecture may include a texture consumption pipeline. The texture compression pipeline may include a processor, memory devices, and textures compressed at varying ratios of compression. The textures within the pipeline may be compressed at ratios in accordance with characteristics of the devices in the pipeline that contains and processes the textures.

16 Claims, 11 Drawing Sheets

(56) References Cited

OTHER PUBLICATIONS

Heckbert, "Survey of Texture Mapping", IEEE Computer Graphics and Applications, Nov. 1986, pp. 56-67. An earlier version of this paper appeared in Graphics Interface '86, May 1986, pp. 207-212.

Lu, et al. "Further Compression of Compressed Texture for Graphics Applications". MS Patent Pre-disclosure Document (317511.01), Date: Jun. 12, 2006, pp. 1-13.

Lu, et al. "A Novel Texture Compression Approach for Graphics Applications". MS Patent Pre-disclosure Document (317510.01), Date: Jun. 13, 2006, pp. 1-11.

Malvar, "Adaptive Run-Length/Golomb-Rice Encoding of Quantized Generalized Gaussian Sources with Unknown Statistics", Date: Dec. 2006, pp. 23-32.

Beers, et al. "Rendering from Compressed Textures" Proceedings of the 23rd Annual Conference on Computer Graphics and Interactive Techniques, Date: 1996, 4 Pages, ACM Press New York, NY, USA.

Tang, et al. "Importance-Driven Texture Encoding Based on Samples", Proceedings of the Computer Graphics International 2005, IEEE Computer Society Washington, DC, USA.pp. 169-176.

Fenney Simon "Texture Compression Using Low-Frequency Signal Modulation", Proceedings of the ACM SIGGRAPH/EUROGRAPHICS Conference on Graphics Hardware, (2003) Eurographics Association Aire-la-Ville, Switzerland, Switzerland. 9 Pages.

Wallace, "The JPEG Still Picture Compression Standard", IEEE Transactions on Consumer Electronics, 1999. pp. 1-17.

Skodras, et al. "The JPEG 2000 Still Image Compression Standard", IEEE Signal Processing Magazine, September 2001. pp. 36-58.

International Search Report and Written Opinion for PCT/US2009/047867; issued Dec. 24, 2009.

* cited by examiner

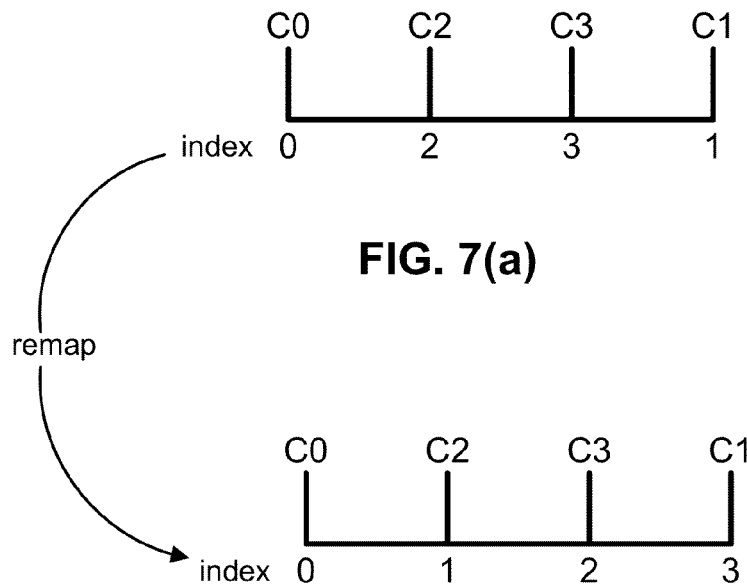
FIG. 7(a)
FIG. 7(b)
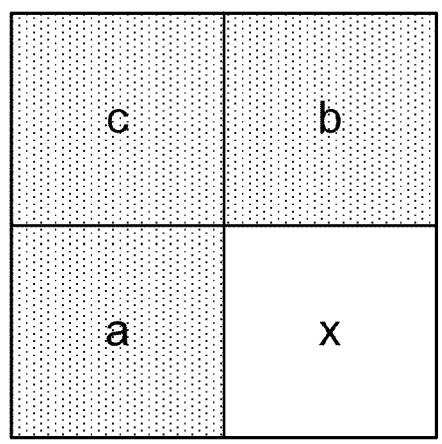
FIG. 8

LAYERED TEXTURE COMPRESSION ARCHITECTURE

BACKGROUND

Texture mapping is a method for adding detail, surface texture, or color to a computer-generated graphic or 3D model. Texture mapping enhances the visual complexity of the 3D objects with a relatively small increase in computational costs. However, the raw textures used in texture mapping consume large amounts of memory and storage space. As such, compressed, i.e., coded, textures are typically used in graphics applications, specifically real-time rendering. Real-time rendering applications can compose images from compressed textures.

For example, DirectX Texture Compression, which may also be known as DXTn, DXTC, and S3TC, is an index-based format that has become the dominant texture compression format in the industry. Indexed-based formats may organize textures into blocks of data, and use commonalities of those blocks to efficiently compress texture data. DXTn typically provides a compression ratio of 8:1 or 4:1 for 32 bits per pixel (bpp) Alpha/Red/Green/Blue (ARGB) textures with little loss in visual quality. Other texture compression formats may employ similar index-based compression technologies.

Generally, texture compression technologies support random addressing. Further, there is generally a trade-off between random addressing and compression ratios. In particular, the compression ratio may depend on the block size used in compression, and the block size may have impacts on the random addressing capability.

It is desirable to achieve ever higher rates of compression, especially for storage devices because the low bandwidth resources typical of storage devices can impede the high performance requirements of graphics processing. However, textures stored with higher rates of compression typically cannot be directly rendered due to limitations in random addressing introduced by the large block sizes of high-compression formats.

SUMMARY

Described herein are implementations of various technologies for a layered texture compression architecture. In one implementation, the layered texture compression architecture may include a texture consumption pipeline. The texture compression pipeline may include a processor, memory devices, and textures compressed at varying ratios of compression. The textures within the pipeline may be compressed at ratios in accordance with characteristics of the devices in the pipeline that contains and processes the textures.

The processor may be a graphics processing unit (GPU) configured for processing textures compressed in an index-based compression format. The textures compressed in the index-based compression format may be stored in a texture cache for processing by the GPU.

The textures may be loaded into the texture cache from a texture (or system) memory after decoding from an intermediate compression format. The intermediate compression format may facilitate random addressing by the texture/system memory. The intermediate compression format may be on top of the index-based compression format, which facilitates ready decoding and conserves space in the texture/system memory.

The textures may be loaded into the texture memory from a peripheral storage after decoding from a storage compression format. With the storage compression format, high ratios of compression may be achieved because the peripheral storage does not use random addressing. Additionally, the storage compression format may conserve bandwidth used by transferring the texture from the peripheral storage to the texture (or system) memory. The storage compression format may be on top of the intermediate compression format, which facilitates ready decoding.

In another implementation, textures may be compressed from the index-based compression format into the intermediate compression format. Textures in the index-based compression format typically describe textures according to base-color information and color-indices. In compressing the textures into the intermediate compression format, the base-color information may be compressed separately from the color-indices. Compressing the base-color information may include transforming the base-color information from a red, green, blue (RGB) space to a luminance-chrominance space. The base-color information may then be transformed according to a Haar or 4×4 integer transformation.

In compressing the color-indices, the color-indices may be re-mapped to represent a color-level progression between the base-colors. The color-indices may then be compressed using a sampling of prediction errors generated for the color-indices. The prediction errors may be generated with a texel-based prediction method.

In another implementation, alpha-channel information may be compressed into the intermediate compression format from the index-based compression format. Alpha-channel information may also be described in two component parts: general alpha information and alpha-indices. The general alpha information may be compressed using the compression methods described above for the base-colors. Similarly, the alpha-index information may be compressed using the above-described methods for compressing color-index information.

In another implementation, textures compressed into the intermediate compression format may be decompressed to the index-based compression format through the inverse application of the methods described above.

The above referenced summary section is provided to introduce a selection of concepts in a simplified form that are further described below in the detailed description section. The summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIG. 7A illustrates a correspondence between color-index values and color-level progression in accordance with implementations described herein.

FIG. 7B illustrates a correspondence between re-mapped color-index values and color-level progression in accordance with implementations described herein.

FIG. 8 illustrates a sample texel map in accordance with implementations described herein.

DETAILED DESCRIPTION

As to terminology, any of the functions described with reference to the figures can be implemented using software, firmware, hardware (e.g., fixed logic circuitry), manual processing, or a combination of these implementations. The term "logic, "module," "component," or "functionality" as used herein generally represents software, firmware hardware, or a combination of these implementations. For instance, in the case of a software implementation, the term "logic," "module," "component," or "functionality" represents program code (or declarative content) that is configured to perform specified tasks when executed on a processing device or devices (e.g., CPU or CPUs). The program code can be stored in one or more computer readable media.

More generally, the illustrated separation of logic, modules, components and functionality into distinct units may reflect an actual physical grouping and allocation of such software, firmware, and/or hardware, or may correspond to a conceptual allocation of different tasks performed by a single software program, firmware program, and/or hardware unit. The illustrated logic, modules, components, and functionality can be located at a single site (e.g., as implemented by a processing device), or can be distributed over plural locations.

The terms "machine-readable media" or the like refers to any kind of medium for retaining information in any form, including various kinds of storage devices (magnetic, optical, solid state, etc.). The term machine-readable media also encompasses transitory forms of representing information, including various hardwired and/or wireless links for transmitting the information from one point to another.

The techniques described herein are also described in various flowcharts. To facilitate discussion, certain operations are described in these flowcharts as constituting distinct steps performed in a certain order. Such implementations are exemplary and non-limiting. Certain operations can be grouped together and performed in a single operation, and certain operations can be performed in an order that differs from the order employed in the examples set forth in this disclosure.

Figure 1:
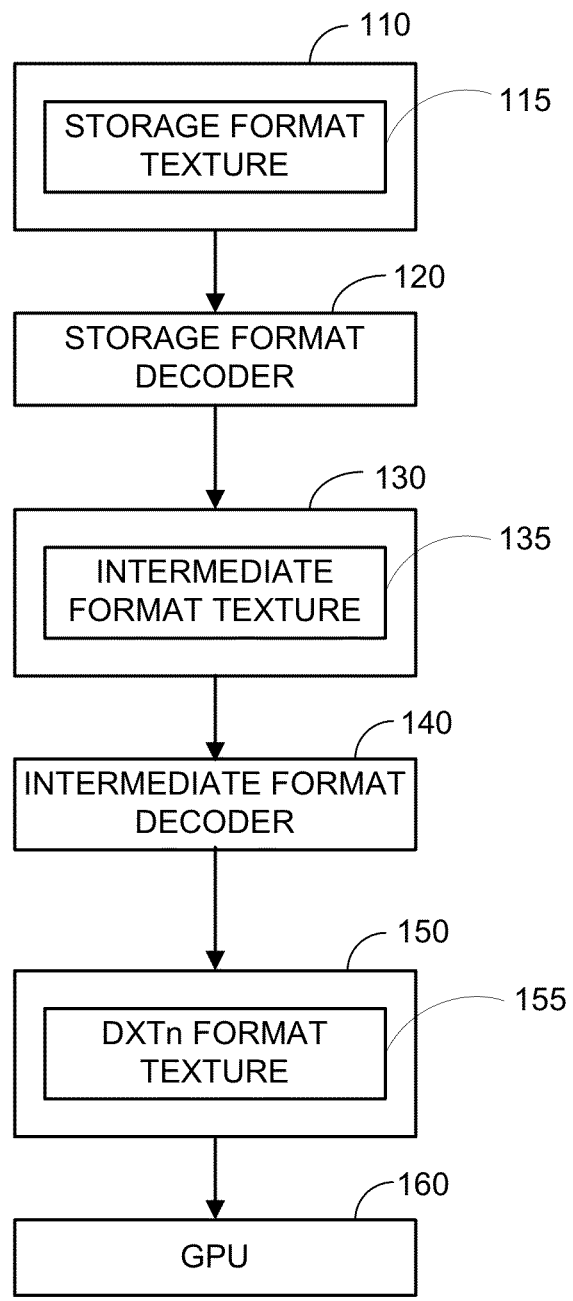
FIG. 1 illustrates a block diagram of a texture consumption pipeline in accordance with implementations described herein.

Typically, the texture mapping process uses a texture consumption pipeline, through which texture data passes before being consumed in the texture mapping process. FIG. 1 illustrates a block diagram of a texture consumption pipeline 100 in accordance with implementations described herein. The texture consumption pipeline 100 may include a peripheral storage 110, a storage format decoder 120, an intermediate storage 130, an intermediate storage decoder 140, a texture cache 150, and a graphics processing unit (GPU) 160.

The peripheral storage 110 may be a computer storage such as CD-ROM, digital versatile disk (DVD), or other optical storage, magnetic cassette, magnetic tape, magnetic disk storage or other magnetic storage device, or any other medium typical of a peripheral storage device that can be used to store the desired information.

The intermediate storage 130 may be a computer storage medium such as a random access memory (RAM). The intermediate storage 130 may also be any other storage medium with random addressability that is typical of a system memory or a texture memory that can be used to store the desired information.

The texture cache 150 may be a typical cache device used by the GPU 160 for texture mapping. The proximity and speed of the texture cache 150 may facilitate efficient data retrieval for the GPU 160.

Typically, the GPU 160 may be configured for texture mapping with texture data compressed to a particular standard. For example, DirectX® Texture Compression (DXTC) is a compression standard widely supported by graphics hardware. DXTC compresses texture data to one of several DXTn formats, e.g., DXT1, DXT2, etc. up to DXT5. As such, the texture cache 150 may contain a DXTn format texture 155. The DXTn format texture 155 may include texture data formatted to the DXTC standard for texture mapping by the GPU 160. In one implementation, the DXTn format texture 155 may contain color data for a 4×4 block of texels. It should be understood that the DXTn format is merely an example of an index-based compression format. The DXTn format texture 155 may contain textures in any index-based compression format.

However, before being stored in the texture cache 150 as the DXTn format texture 155, texture data may be retrieved from the peripheral storage 11 0, passing first through the intermediate storage 130.

For example, when the GPU 160 needs a piece of data for the texture mapping, the GPU 160 first looks for the data in the DXTn format texture 155 in the texture cache 150. If the data is not in the texture cache 150, the GPU 160 may look in the intermediate format texture 135 in the intermediate storage 130. If the data is not in the intermediate storage 130, the GPU 160, or another processor (not shown), may retrieve the data from the storage format texture 115 in the peripheral storage 110. The GPU 160 or other processor may then transfer the data retrieved from the peripheral storage 110 to the intermediate storage 130 and the texture cache 150.

However, because the amount of data transferred between storage devices influences the amount of time transferring the data, transferring smaller amounts of data, i.e., compressed data, may be more efficient than transferring larger amounts of data, i.e., uncompressed data.

While the DXTn format texture 155 may be compressed, it should be noted that the intermediate storage 130 typically provides better performance as the amount of memory used for storage is decreased. However, as compression levels increase, the ability to access data randomly may be reduced, or even eliminated. Accordingly, an intermediate format texture 135 may be stored on the intermediate storage 130. The intermediate format texture 135 may be a more highly compressed version of the DXTn format texture 155. Additionally, the intermediate format texture 135 may be compressed, or coded, on top of the DXTn format texture 155. It should be noted that the terms compressed and coded may be used interchangeably herein By coding the intermediate format texture 135 on top of the DXTn format texture 155, the intermediate format texture 135 may be readily decoded into the DXTn format texture 155. Formatting the intermediate format texture 135 for ready decoding into the DXTn format texture 155 may ensure that the performance gain of reduced storage on the intermediate storage 130 is not negated by the time used to decode the intermediate format texture 135. In one implementation, the intermediate format texture 135 may be of fixed length.

The intermediate format decoder 140 may decode the intermediate format texture 135 to the DXTn format texture 155, and load the DXTn format texture 155 into the texture cache 150. The intermediate format decoder 140 is described in greater detail with reference to FIG. 12.

While the intermediate format texture 135 may also be compressed, bandwidth between the peripheral storage 110 and the intermediate storage 130 may make transferring the intermediate format texture 135 out of the peripheral storage 110 a bottleneck for the texture mapping process. Because the peripheral device 110 typically does not use random addressability to access data, a higher compression ratio may be used for data stored in the peripheral storage 110. As such, the peripheral storage 110 may store a storage format texture 115, which may be a more compressed version of the intermediate format texture 135.

Because the storage format texture 115 is more compressed than the intermediate format texture 135, the storage format texture 115 may be transferred to the intermediate storage 130 more efficiently than the intermediate format texture 135, and the DXTn format texture 155. The storage format texture 115 may be coded on top of the intermediate format texture 135, which may facilitate ready decoding into the intermediate format texture 135.

The storage format decoder 120 may be hardware or software that decompresses the storage format texture 115 into the intermediate format texture 135, then loads the intermediate format texture 135 into the intermediate storage 130. The storage format decoder 120 is described in greater detail with reference to FIG. 2.

As stated, the storage format texture 115 may be the source of texture data passing through the texture consumption pipeline 100. However, because the storage format texture 115 may be compressed on top of the intermediate format texture 135, which is compressed on top of the DXTn format 155, the DXTn format texture 155 may be the source for a compression method that produces the intermediate format texture 135, and in turn, the storage format texture 115.

Figure 2:
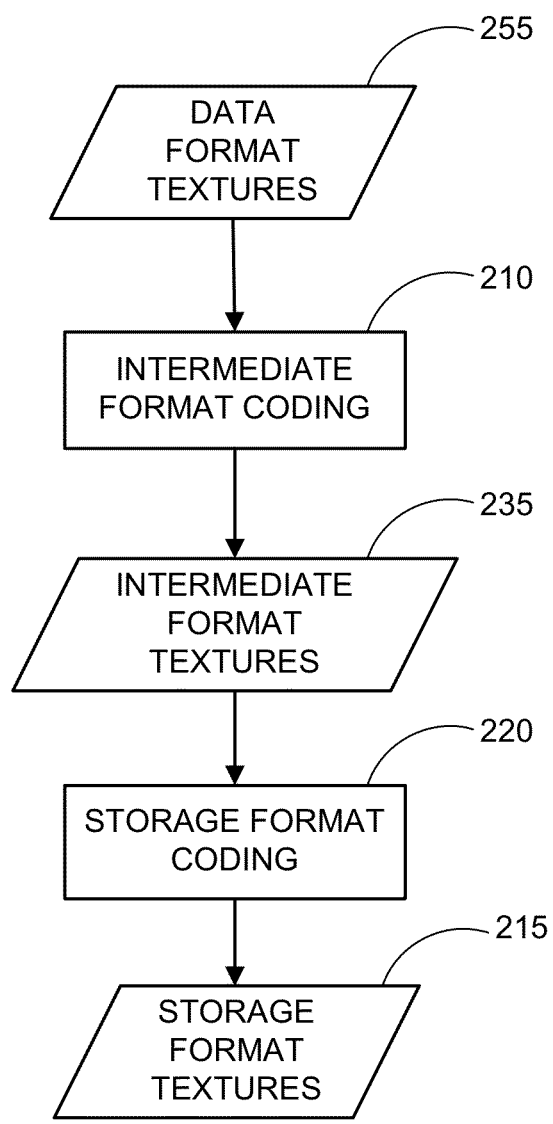
FIG. 2 illustrates a data flow diagram of a method for layered texture compression in accordance with implementations described herein.

FIG. 2 illustrates a data flow diagram of a method 200 for layered texture compression in accordance with implementations described herein. Whereas the texture compression pipeline 100 may facilitate rapid consumption of DXTn format textures 155 by an online application, such as a game, method 200 for layered texture compression may be performed offline. By performing method 200 offline, a brute force approach may be employed that provides an optimal compression for the layered textures of the texture consumption pipeline 100: the storage format texture 115, and the intermediate format texture 135.

While the storage format texture 115 may serve as the input to the texture consumption pipeline 100, DXTn format textures 255 may serve as the input to method 200.

The DXTn format textures 255 may represent a collection of DXTn format textures 155. As such, the DXTn format textures 255 may be arranged in blocks, also referred to herein as macro-blocks, of DXTn format textures 155. In one implementation, the macro-block may contain a 4×4 block of DXTn format textures 155. In a scenario where the DXTn format texture 155 may contain color data for a 4×4 block of texels, the macro-block may contain color data for a 16×16 block of texels. Of course, the block sizes noted here are examples. The actual size of the macro-block, or individual DXTn format textures 155 may vary in implementations described herein.

DXTn format textures 255 may be input to an intermediate format coding process 210. The intermediate format coding process 210 may compress DXTn format textures 255 into intermediate format textures 235. As such, the intermediate format coding process 210 may perform the complement of the decoding process performed by the intermediate format decoder 140. The intermediate format coding process 210 is described in greater detail with reference to FIGS. 3-9.

The intermediate format textures 235 may represent a collection of intermediate format textures 135. As such, the intermediate format coding process 210 may represent the complement of the process performed by the intermediate format decoder 140.

The intermediate format textures 235 may contain all the compressed macro-blocks of the DXTn format textures 255. To facilitate decoding the intermediate format textures 235, the length of each compressed macro-block may be fixed within the intermediate format textures 235.

The intermediate format textures 235 may be input to a storage format coding process 220. The storage format coding process 220 may compress the intermediate format textures 235 to storage format textures 215. As such, the storage format coding process 210 may represent the complement of the process performed by the storage format decoder 120. In one implementation, the storage format coding process 220 may use arithmetic entropy coding.

Figure 3:
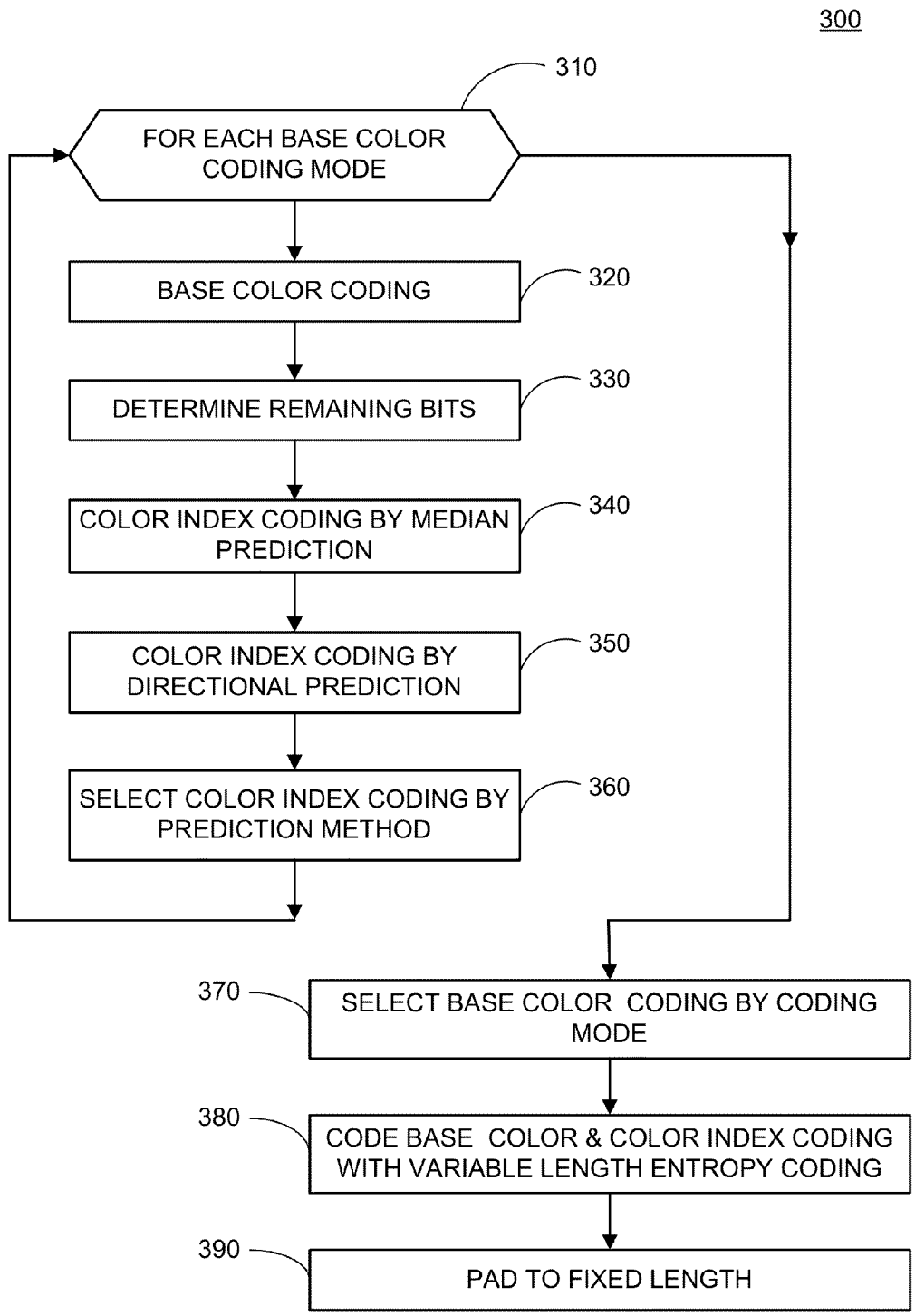
FIG. 3 illustrates a flowchart of a method for intermediate format coding in accordance with implementations described herein.

FIG. 3 illustrates a flowchart of a method 300 for intermediate format coding in accordance with implementations described herein. Method 300 may be repeated for each macro-block in the DXTn format textures 255, producing the intermediate format textures 235.

Index-based compression technologies such as DXTn typically describe textures in terms of base-colors and color-indices. In one implementation, the base-colors may represent 2 color-levels, referred to herein as C0 and C1. The base-colors may represent a range of colors that includes the color-levels of all the texels within one DXTn format texture 155.

Typically, a color-index for each texel may be included in the DXTn format textures 255. The color-indices may identify a color-level for each texel that is within the base-color range.

Method 300 for intermediate format coding may compress DXTn format textures 255 by separately compressing the base-color data and the color-index data in the DXTn format textures 255. Method 300 may be repeated for each macro-block in the DXTn format textures 255.

The base-color coding may be performed in two modes: a gray mode, and a non-gray mode. As such, steps 310-360 may be repeated for each base-color coding mode.

At step 320, the base-colors may be coded according to the base-color coding mode. Gray mode coding may be a lossless compression process for gray, and near-gray DXTn format textures 255. Gray mode coding is described in greater detail with reference to FIG. 4. Non-gray mode coding may be a lossy compression process for colorized DXTn format textures 255. Non-gray mode coding is described in greater detail with reference to FIG. 5.

Because the intermediate format textures 235 may be of fixed length, the color-index coding may be constrained to fit the compressed color-indices within the bits remaining in the fixed length format after the base-color coding. As such, at step 330, the number of bits remaining in the fixed length format after the base-color coding may be determined.

It should be noted that the base-colors and color-indices may be further compressed after the respective base-color and color-index coding. It is this further compression that is used to fit the compressed base-colors and color-indices into the fixed length format of the intermediate format textures 235. In one implementation, variable length entropy coding may be applied to the base-color and color-index coding to produce the intermediate format textures 235. As such, an entropy coder may be used to determine the number of bits occupied by the base-colors after the base-color coding. Accordingly, the number of remaining bits for the compressed color-indices may be determined based on the length of the fixed-length format and the number of bits occupied by the compressed base-colors.

Color-index coding may employ texel-based prediction methods whereby color-index values are predicted for each texel. Coding predicted color-index values instead of the actual color-index values may facilitate ready decoding by the intermediate format decoder 140. Color-index coding is described in greater detail with reference to FIGS. 6-7.

At step 340, color-index coding by median texel-based prediction may be performed. The median texel-based prediction method may predict color-index values for each texel based on the color-index values of neighboring texels. Median texel-based prediction is described in greater detail with reference to FIG. 6.

At step 350, color-index coding by directional texel-based prediction may be performed. The directional texel-based prediction method may predict color-index values for each texel based on directional patterns of color-levels in neighboring texels. Directional texel-based prediction is described in greater detail with reference to FIG. 6.

At step 360, the color-index coding with the prediction method that produces the lowest color-level sum of absolute difference (SAD) may be selected. As such, each base-color coding (gray mode and non-gray mode) may be paired with a color-index coding.

Because the actual color-indices are not coded into the intermediate format textures 235, the color-indices produced by decoding the intermediate format textures 135 may be different than the color-indices represented in the DXTn format textures 255. In this manner, the color-levels represented by the respective color-indices may also differ. However, the difference between the coded and decoded color-levels may be attenuated by selecting the compressed color-indices produced by the color-index coding method that produces the smaller difference between coded and decoded color-levels.

At step 370, the base-color/color-index coding pair that produces the lowest color-level SAD may be selected for compression into the intermediate format textures 235.

At step 380, the selected base-color/color-index coding pair may be further coded with variable length entropy coding. The variable length entropy coding is described in greater detail with reference to FIGS. 10-11.

Because the intermediate format textures 235 may be a fixed length, at step 390, the compressed base-colors and color-indices produced at step 380 may be padded to the fixed length with stuffing bits.

Figure 4:
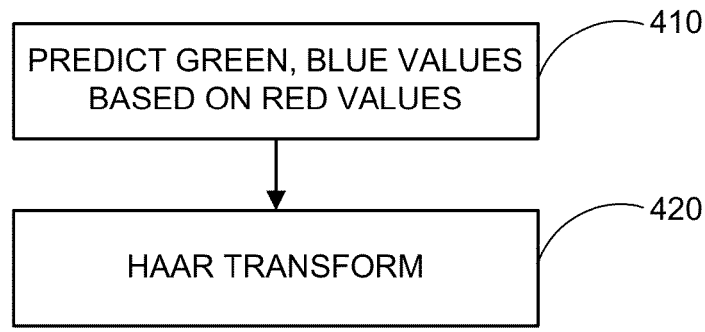
FIG. 4 illustrates a flowchart of a method for base-color coding in gray mode in accordance with implementations described herein.

FIG. 4 illustrates a flow chart of a method 400 for base-color coding in gray mode according to implementations described herein. The base-colors in the DXTn format textures 255 typically include three color component values: red (R), green (G), and blue (B). At step 410, the prediction errors of the B and G components may be determined based on the values of the R components, as follows:

$$\Delta G = G - (R << 1)$$

$$\Delta B = B - R$$

At step 420, the R component values, and the prediction errors for the G and B component values may be converted to high and low-pass signals with a Haar transform. The Haar transform facilitates compression by de-correlating spatial relationships between the component color values. For each component, the following calculations may be used in the Haar transform:

$$\text{High pass signal: } H = C0 - C1$$

$$\text{Low pass signal: } L = C1 + (H+1) >> 1.$$

More specifically, the C0 and C1 referenced in the above formulas may be the values of the R, G, and B components of the base-colors. The Haar transform may be individually applied to each component.

Figure 5:
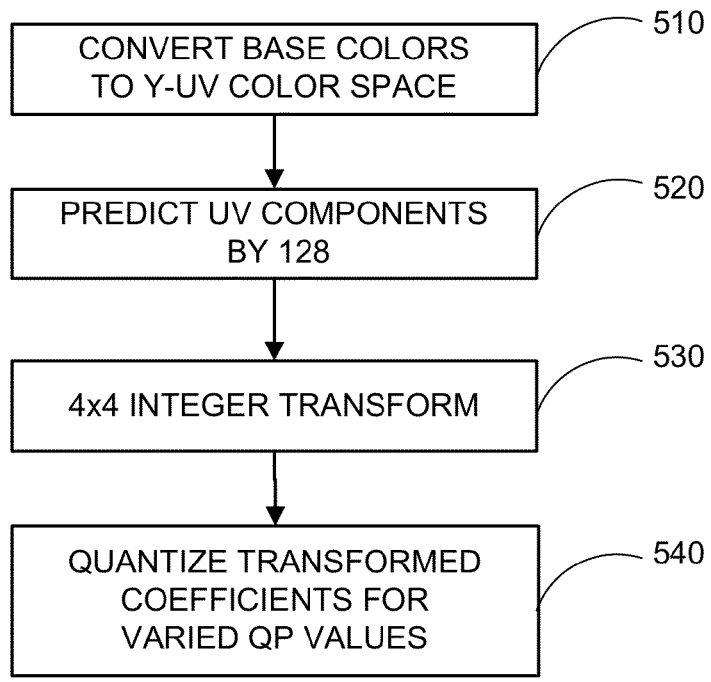
FIG. 5 illustrates a flowchart of a method for base-color coding in non-gray mode in accordance with implementations described herein.

FIG. 5 illustrates a flow chart of a method 500 for base-color coding in non-gray mode according to implementations described herein. Although the base-colors may include R, G, and B components, it is possible to describe color-levels in terms of luminance (Y) and chrominance (U, V) values. For non-gray mode coding of base-colors, lossy compression can be achieved by emphasizing the Y components of the base-colors over the UV component values. As such, at step 510, the base-colors may be converted from the RGB color space to the Y-UV color space. The conversions may be performed as follows:

$$Y = ((66*R + 129*G + 25*B + 128) >> 8) + 16$$

$$U = ((-38*R - 74*G + 112*B + 128) >> 8) + 128$$

$$V = ((112*R - 94*G - 18*B + 128) >> 8) + 128$$

At step 520, the UV component values may be predicted by 128, according to the following formulas:

$$\Delta U = U - 128$$

$$\Delta V = V - 128$$

At step 530, a 4×4 integer transform may be used to perform spatial transformation on the predicted Y-UV components of the base-colors. The 4×4 integer transform may produce 4×4 coefficients for each of the Y-UV components for the macro-block.

The 4×4 integer transform may be performed to achieve coefficient energy compaction similar to traditional direct cosine transform (DCT). Advantageously, the 4×4 integer transform merely involves integer arithmetical operations, without loss of accuracy, unlike traditional DCT. One typical 4×4 integer transform may be expressed as follows:

$$Y = M \times X \times M^T.$$

where X denotes an input 4×4 matrix, Y denotes an output 4×4 matrix that contains the transformed coefficients, and $M^T$ is the transpose of the matrix M. In one implementation, the matrix M may be as follows:

$$M = \begin{bmatrix} 1 & 1 & 1 & 1 \\ 2 & 1 & -1 & -2 \\ 1 & -1 & -1 & 1 \\ 1 & -2 & 2 & -1 \end{bmatrix}.$$

At step 540, the coefficients produced from the 4×4 integer transform may be quantized. Quantization typically employs a divisor before rounding the divided coefficient value to an integer value.

QP may represent a value that is varied to produce multiple quantizations for a particular 4×4 integer transform. The multiple quantizations may be produced in order to find a quantization that facilitates jointly optimizing the base-color and color-index coding. As such, step 540 may be repeated for each QP value.

In one implementation, the QStep calculation may be replaced by a look-up table indexed by QP values. The look-up table may incorporate a post-scaling factor that makes the 4×4 integer transform orthogonal.

In one implementation, the DXTn format textures 255 may include DXT5 format textures. It should be noted that alpha channel information may be included in DXT5 format textures. Alpha channel information may denote the transparency/opaqueness of the texels in the DXT5 format texture. Specifically, the DXT5 format texture may include two 8-bit main alpha values. In such an implementation, the two 8-bit main alpha values may also be coded according to the steps described above in methods 400 and 500.

Figure 6:
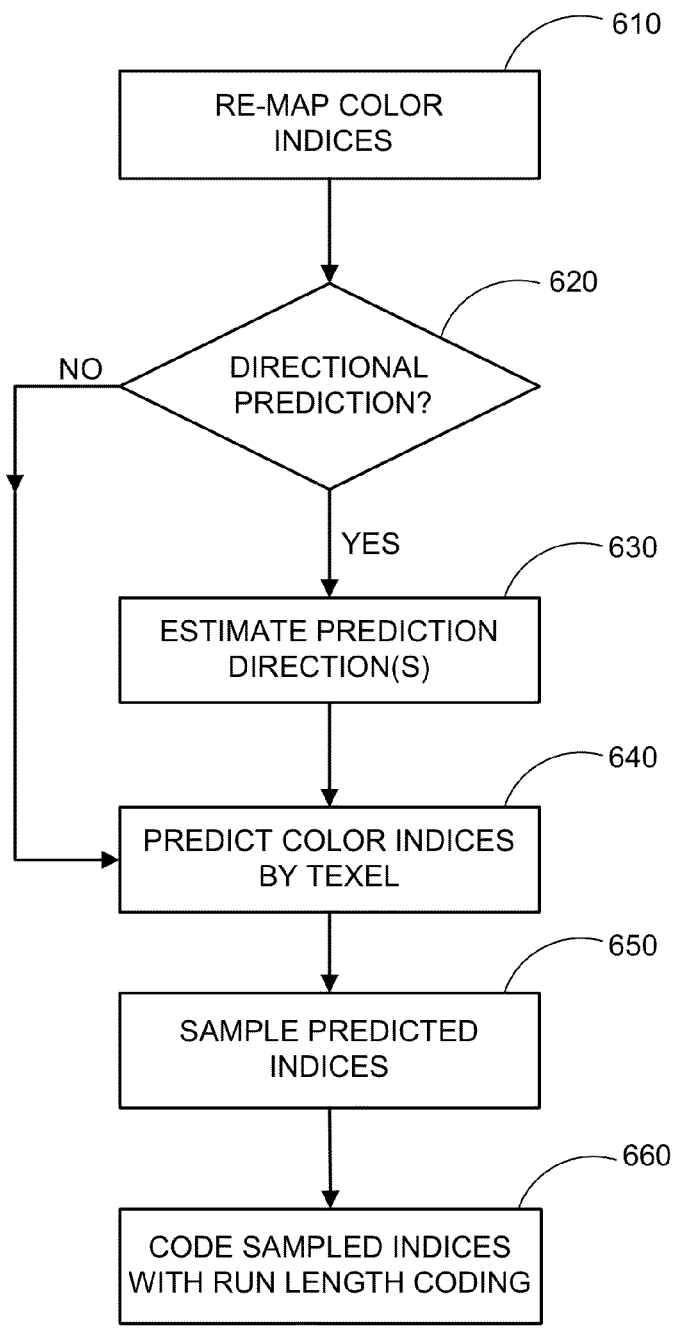
FIG. 6 illustrates a flowchart of a method for color-index coding in accordance with implementations described herein.

FIG. 6 illustrates a flow chart of a method 600 for color-index coding according to implementations described herein. The color-index coding method 600 may be performed for each macro-block in the DXTn format textures 255. Additionally, the method 600 may be performed for each of a median texel-based prediction and a directional texel-based prediction.

Typically, texel-based prediction assumes a progressive representation of color-levels in the color-index values. In other words, as the color-index value increases, the color-levels represented by the associated color-indices increase, or progress, from base-color C0 to base-color C1. However, the color-levels represented by the color-indices in the DXTn format textures 255 may not be progressive representations of color-levels.

FIG. 7A illustrates the correspondence between the color-index values and the color-level progression from base-color C0 to base-color C1. As stated, the base-colors C0 and C1 may represent the range of color-levels for the texels in one DXTn format texture 155. Colors C2 and C3 in FIG. 7A may represent two middle color-levels within the C0-C1 color range. In DXTC, each texel may be assigned the color-index value associated with the color-level (represented by C0-C3) that is closest to the texel's actual color-level. For example, if the actual color-level of a texel is closest to the color-level represented by C3, the color-index value associated with that texel is 3.

As shown, color-level progression may proceed as follows: C0, C2, C3, and C1. However, in typical DXTC, the color-index values may proceed as follows: 0, 2, 3, and 1. In this manner, the index values may not be progressive representations of color-levels. As such, at step 610, the color-indices for each texel may be re-mapped to progressively represent color-levels.

Accordingly, all texels with a color-index value of 2 may be re-mapped to a color-index value of 1. Similarly, all texels with a color-index value of 3 may be re-mapped to a color-index value of 2, etc. FIG. 7B illustrates a correspondence between re-mapped color-index values and color-level progression according to implementations described herein.

Referring back to FIG. 6, at step 620, the texel-based prediction method may be queried to determine whether the method 600 is employing directional prediction or median prediction. If directional prediction is employed, at step 630 a prediction direction may be estimated.

In directional prediction, the color-index prediction for each texel may be based on a direction of color-level patterns within the macro-block. As such, the directional prediction incurs an overhead cost to record the direction used for directional prediction in the compressed color-indices. In one implementation, one direction prediction may be used for the entire macro-block. However, by limiting the entire macro-block to one direction, prediction accuracy may be compromised. Accordingly, in another implementation, the overhead may be limited by adjusting the block size of the macro-block in balance with prediction accuracy. In this manner, the prediction direction may be estimated based on an adaptively sized macro-block, whereby the size of the macro-block may be determined based on an optimal balance of overhead and prediction accuracy.

At step 640, the color-indices for all texels within the macro-block may be predicted according to median or directional texel-based prediction. As stated, in median texel-based prediction, the color-index for a texel may be predicted based on the color-index of neighboring texels.

FIG. 8 illustrates a sample texel map 800 that may be used for median texel-based prediction in accordance with implementations described herein. The texel map 800 may include texels a, b, c, and x, arranged as shown. In this example, the color-index for the texel x may be predicted as follows:

$$\hat{x} = (a+b+1) \gg 1$$

In this example, a and b may be the color-indices of texels a and b, respectively. In a scenario where texels a or b are not within the boundaries of the macro-block, a default value, such as 0, may be substituted for their respective color-indices.

Referring back to FIG. 6, directional texel-based prediction may be alternately employed at step 640. The directional texel-based prediction may be based on the prediction direction that is estimated at step 630. There are four possible prediction directions: direct current (DC), left, up, and up-left.

Referring again to FIG. 8, the color-index for a texel x may be predicted as follows:

$$\hat{x} = \begin{cases} (a+b+1) \gg 1 & \text{when DC prediction} \\ a & \text{when left prediction} \\ b & \text{when up prediction} \\ c & \text{when up-left prediction} \end{cases}$$

In this example, a, b, and c may be the color-indices of texels a, b, and c, respectively.

Referring back to FIG. 6, at step 650, the prediction errors of the predicted color-indices may be sampled. The sampling may determine whether coded prediction errors are included in the compressed color-indices. In this manner, each texel's prediction error may be designated as a skipped or refreshed. Refreshed prediction errors may be included in the compressed color-indices; skipped prediction errors may not. The designation may facilitate decoding the intermediate format texture 135. The prediction errors for each texel may be the difference between the predicted color-index and the re-mapped color-index (as determined at step 610). Sampling is described in greater detail with reference to FIG. 9.

At step 660, the sampled prediction errors may be coded using run-length coding.

In the implementation where the DXTn format textures 255 include DXT5 format textures, the DXT5 format textures may include 3-bit alpha-indices for each texel.

In another implementation, the DXTn format textures 255 may include DXT3 format textures. Typically, DXT3 format textures may include 4-bit alpha-indices for each texel. In such implementations, the alpha-indices may also be coded according to the steps 620-660 described above for the method 600.

Figure 9:
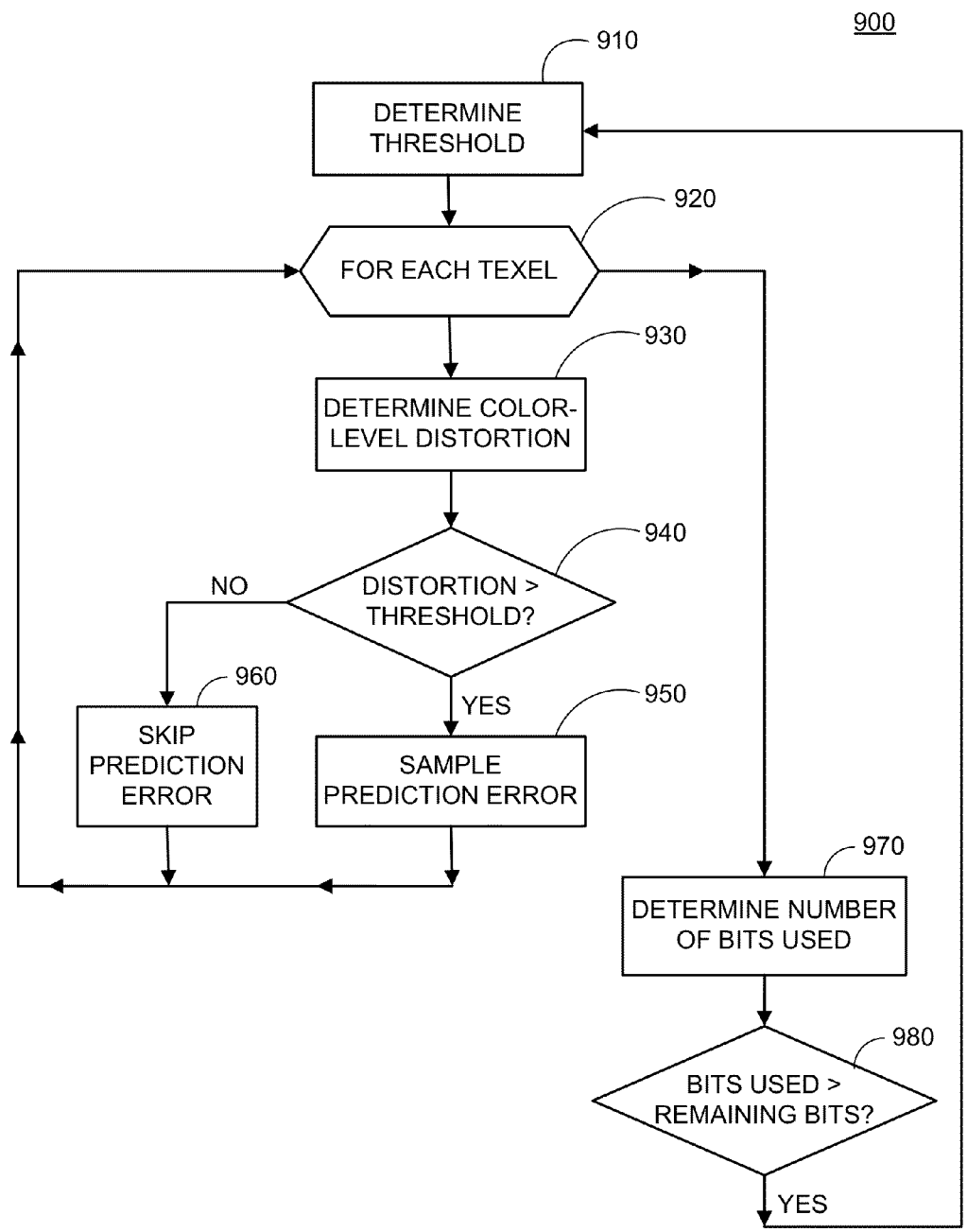
FIG. 9 illustrates a flowchart of a method for sampling color-index prediction errors in accordance with implementations described herein.

FIG. 9 illustrates a flowchart of a method 900 for sampling color-index prediction errors in accordance with implementations described herein. Sampling color-index prediction errors may facilitate efficient lossy color-index compression.

In one implementation, a threshold value may be varied to control a rate of compression. A low threshold value may produce a low rate of compression, and a high threshold value may produce a high rate of compression. As such, steps 910-960 may be repeated by varying the threshold value to vary the rate of compression for the color-indices. Sampling for each threshold value may be performed by repeating steps 920-960 for each texel.

At step 930, a color-level distortion may be determined. The color-level distortion may be the difference between the color-level associated with the texel's re-mapped color-index, and the color-level for the texel's predicted color-index.

At step 940, the color-level distortion may be compared to the threshold value. If the color-level distortion is greater than the threshold value, at step 950, the prediction error for the color-index may be sampled for coding. If the color-level distortion is not greater than the threshold value, at step 960, the prediction error for the color-index may be skipped for coding.

In one implementation, the DXTn format texture 155 may be a DXT1 format texture. Typically, DXT1 format textures include an alpha channel that is based on the color-levels of the base-colors, C0 and C1. The alpha channel may denote whether a texel is transparent or opaque. For example, if the actual color-index for a texel is not 3, the texel may be opaque. However, if the actual color-index for a texel is 3, the color-levels of the base-colors (C0 and C1) may be compared. If the color-level of C1 is less than the color-level of C0, the texels with a color-index of 3 may be transparent, otherwise the texels may be opaque.

In lossy index compression, obvious visual artifacts may be introduced in a texture if a transparent texel is changed to opaque, or vice-versa. As such, the sampling step at 940 may include a second test that may ensure that prediction errors are sampled in cases where a skipped prediction error may introduce a change in the alpha channel. In other words, if the predicted color-index changes the alpha channel from that represented by the actual color-index, the prediction error may be sampled for coding.

After all the texels have been evaluated for sampling, at step 970, the number of bits used for compressing the sampled color-indices may be determined. In one implementation, an entropy coder may determine the number of bits used for the compression.

At step 980, the number of bits used for compressing the color-indices may be compared to the number of remaining bits after base-color coding. If the number of bits used by color-index compression is greater than the number of remaining bits, the threshold value may be increased, and method 900 may be repeated. In this manner, the color-index coding may be produced such that the color-index coding for each macro-block fits within the fixed length of the intermediate format textures 235.

In the implementations where the DXTn format textures may include DXT3 and DXT5 textures, method 900 may be used for alpha-index coding. As such, the bits used for both color-index and alpha-index coding may need to fit within the remaining bits. In one implementation, the allocation of color-index coding and alpha-index coding bits may be determined by jointly minimizing the SAD for both color-index and alpha-index coding according to the following formula:

$$\min_R SAD_{JOINT} = \min_R (SAD_{RGB} + c \cdot SAD_{ALPHA})$$

In the above formula, $SAD_{JOINT}$ may denote the joint sum of absolute difference. $SAD_{RGB}$ may denote the SAD between the uncoded and decoded color-levels associated with the color-indices. $SAD_{ALPHA}$ may denote the difference between the uncoded and decoded alpha channel. c may be a constant that favors minimizing $SAD_{ALPHA}$ over $SAD_{RGB}$ because distortions in the alpha channel incur a heavier visual impact in the decoded textures than distortions in the RGB channels.

Figure 10:
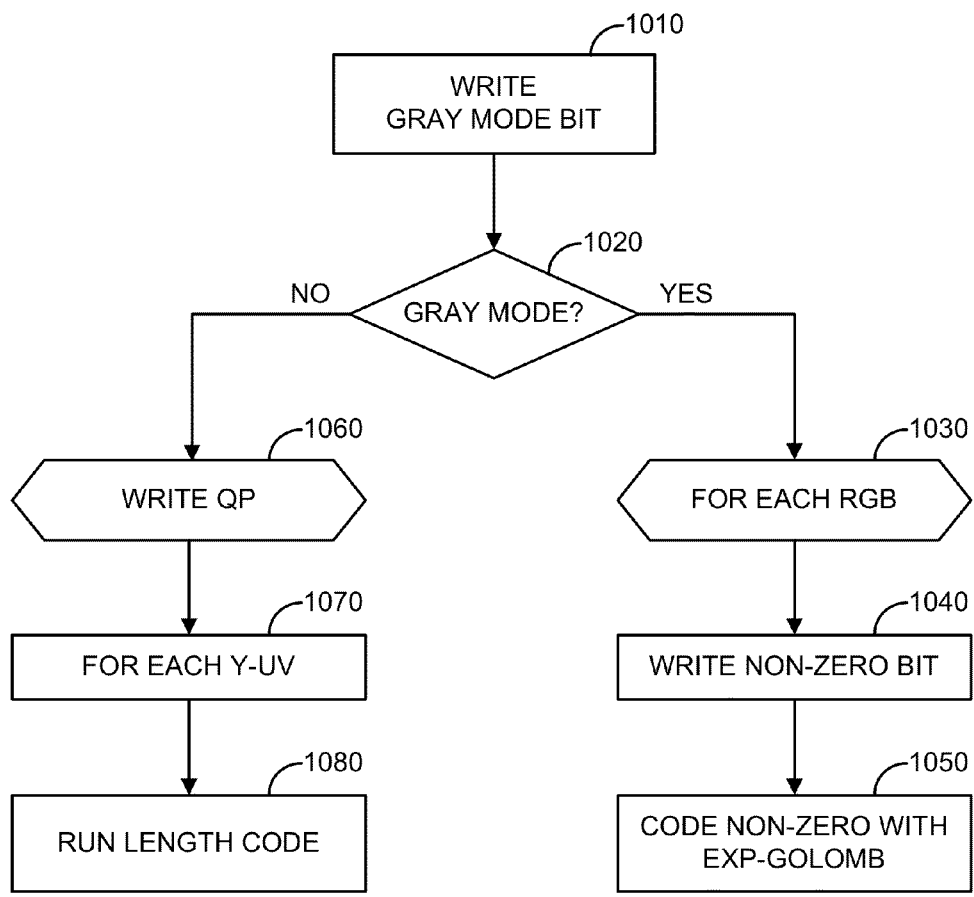
FIG. 10 illustrates a method for variable length entropy coding base-colors in accordance with implementations described herein.

FIG. 10 illustrates a method 1000 for variable length entropy coding base-colors according to implementations described herein. Method 1000 may be repeated for each compressed macro-block. Variable length entropy coding may produce a bit stream for the base-colors that is included in the intermediate format texture 235.

At step 1010, a bit for the base-color coding mode may be written to the bit stream. The bit may indicate gray mode or non-gray mode base-color coding.

At step 1020, the base-color coding mode may be queried to determine whether the macro-block is compressed using gray mode. If so, at step 1030, steps 1040-1060 may be repeated for each of the high and low-pass values for each of the R, G, and B component of the base-colors.

At step 1050, a zero/non-zero bit may be written. The zero/non-zero bit may indicate whether the high/low-pass value is a zero value. At step 1060, non-zero values may be written using variable length Exp-Golomb code representations.

If the base-color coding mode is non-gray mode, at step 1060, the QP determined during base-color coding may be written using 6-bits. Steps 1070-1080 may be repeated for each of the Y, U, and V components of the base-colors.

At step 1080, the quantized coefficients of the Y/U/V components may be written using run-length coding representations.

Figure 11:
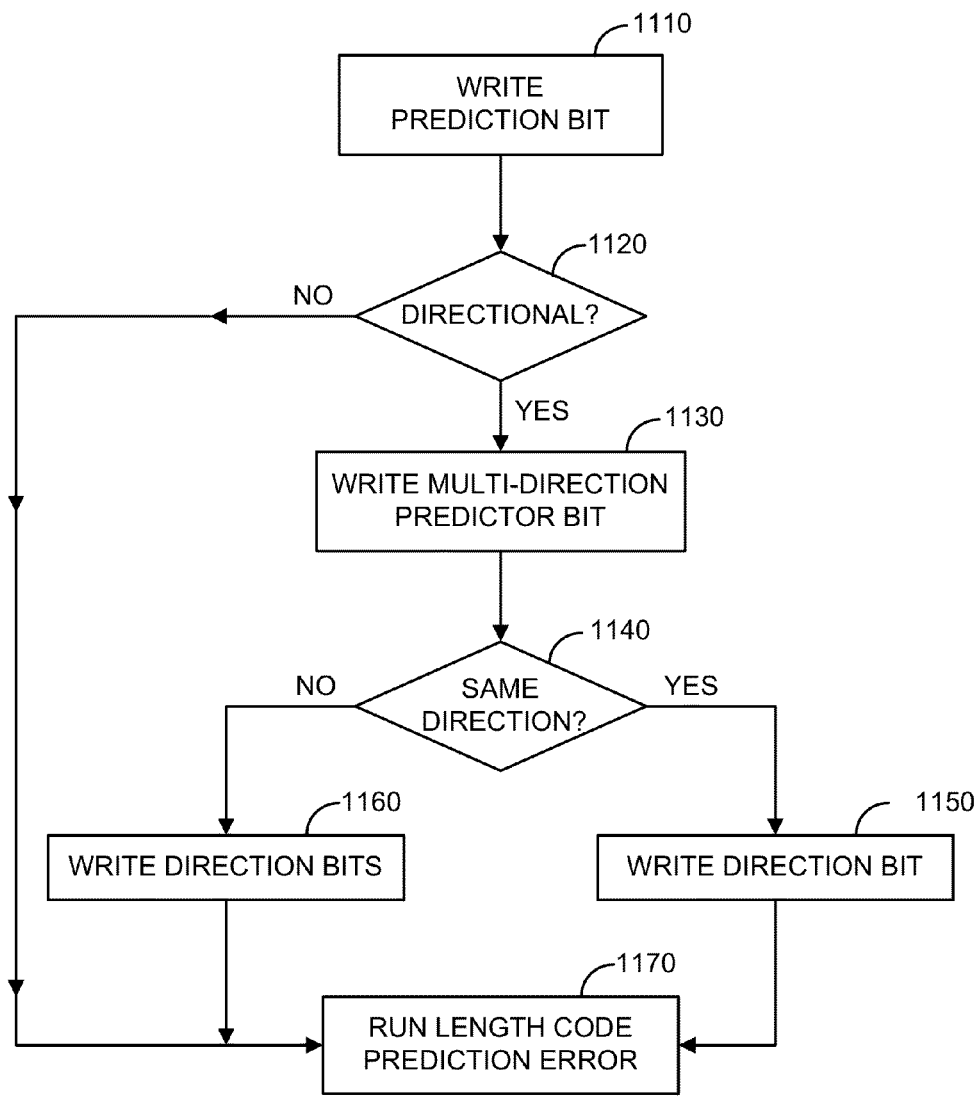
FIG. 11 illustrates a method for variable length entropy coding color-indices in accordance with implementations described herein.

FIG. 11 illustrates a method 1100 for variable length entropy coding color-indices, according to implementations described herein. Method 1100 may be repeated for each compressed macro-block. Variable length entropy coding may produce a bit stream for the color-indices that is included in the intermediate format texture 235.

At step 1110, a prediction bit may be written. The prediction bit may indicate whether the texel-based prediction method used in color-index coding is directional or median prediction.

At step 1120, if the texel-based prediction method used in color-index coding is not directional prediction, method 1100 may proceed to step 1170.

If the texel-based prediction method used in color-index coding is directional prediction, method 1100 may proceed to step 1130. At step 1130, a multi-directional bit may be written. The multi-directional bit may indicate whether the same direction is used for directional prediction for the entire macro-block.

At step 1140, if the same direction is used for directional prediction for the entire macro-block, method 1100 proceeds to step 1150. At step 1150, direction bits may be written. The direction bits may indicate the direction used for the directional prediction.

If the same direction is not used for directional prediction for the entire macro-block, method 1100 proceeds to step 1160. At step 1160, direction bits may be written for each direction used for the directional predictions.

Figure 12:
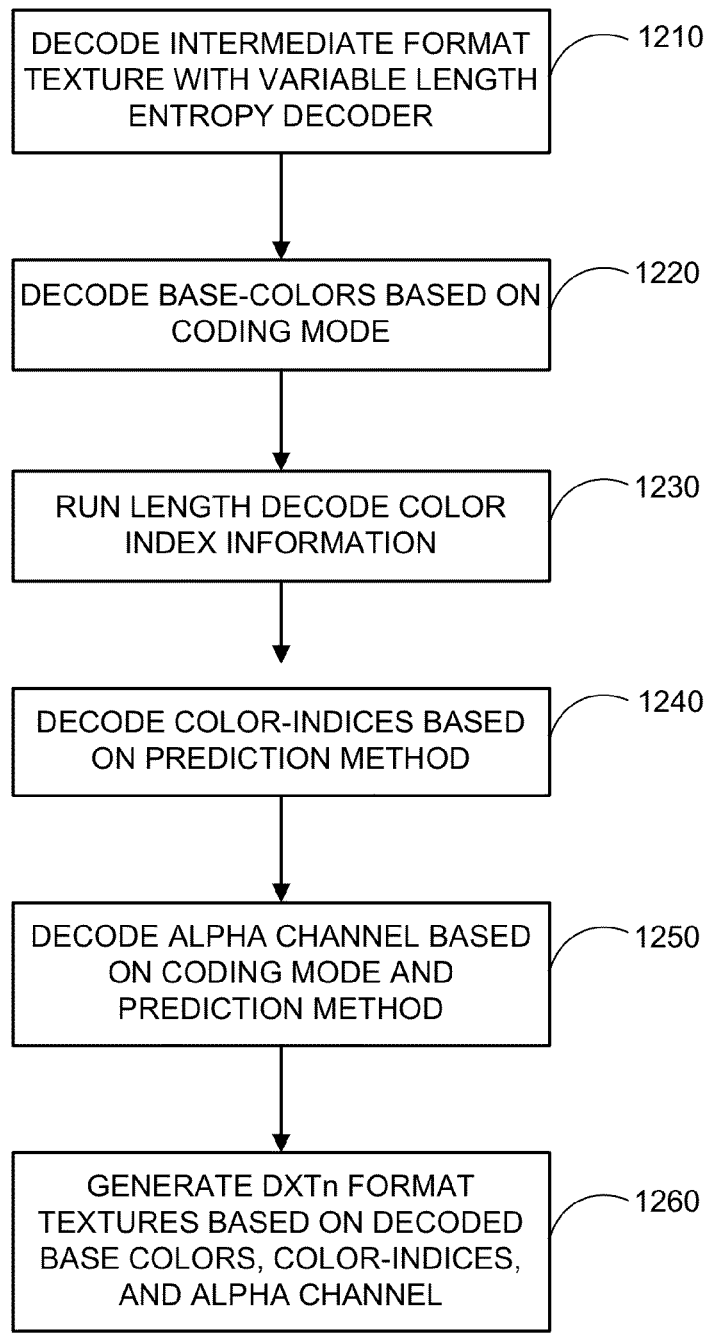
FIG. 12 illustrates a flowchart of a method for decompressing textures, in accordance with implementations described herein.

At step 1170, the prediction errors for each sampled color-index may be written using run-length coding FIG. 12 illustrates a flow chart of a method 1200 for decompressing textures in accordance with implementations described herein. The method 1200 may generate the DXTn format texture 155 by decoding the intermediate format texture 135.

At step 1210, base-color and color-index information may be decoded from the intermediate format texture 135 with a variable length entropy decoder. The variable length entropy decoder may determine for the base-colors: the base-color coding mode, the high and low-pass signals of the base-color components, the quantized coefficients of the transformed base-color components, and the Quantization Parameter (QP).

The variable length entropy decoder may determine for the color-indices: the color-index prediction method and the run-length coded prediction errors for each texel in the intermediate format texture 135.

At step 1220, the base-color information may be further decoded based on the base-color coding mode. In the case of gray mode coded base-colors, an inverse Haar transform may be performed to determine the each of the RGB base-color components, as follows:

$$C1 = L - (H+1) \gg 1$$

$$C0 = H + C1$$

In the case of non-gray mode coded base-colors, the quantized coefficients may be dequantized using the QP. An inverse 4×4 integer Transform may be performed on the dequantized coefficients to determine each of the Y-UV base-color components. Additionally, the determined Y-UV base-color components may be converted back to RGB values using the following formulas:

$$R = \text{clip}((298*Y + 409*V + 128) \gg 8)$$

$$G = \text{clip}((298*Y - 100*U - 208*V + 128) \gg 8)$$

$$B = \text{clip}((298*Y + 516*U + 128) \gg 8)$$

wherein clip means that the calculated value may be constrained within the rang 0 to 255.

At step 1230, the color-index information may be decoded using a run-length decoder. The run-length decoder may produce the sampled prediction errors for each texel in the intermediate format texture 135.

At step 1240, the original color-indices for the texels may be determined from the sampled prediction errors based on the prediction method used to code the color-indices. Color-indices may be predicted based on the median or directional prediction method used to compress the color-index information. The predicted color-indices may then be modified by the sampled prediction errors. The original index representation may then be determined by re-mapping the modified color-indices from a color-level progression representation to an original index representation.

At step 1250, the alpha channel information may be decoded based on the coding mode and prediction method used to code the alpha channel. The decoding of the alpha channel may be the same decoding that is described above in steps 1210-1240.

At step 1260, the base-color, color-index, and alpha channel information determined in the steps described above may be formatted into an appropriate DXTn format to generate the DXTn format texture 155.

Figure 13:
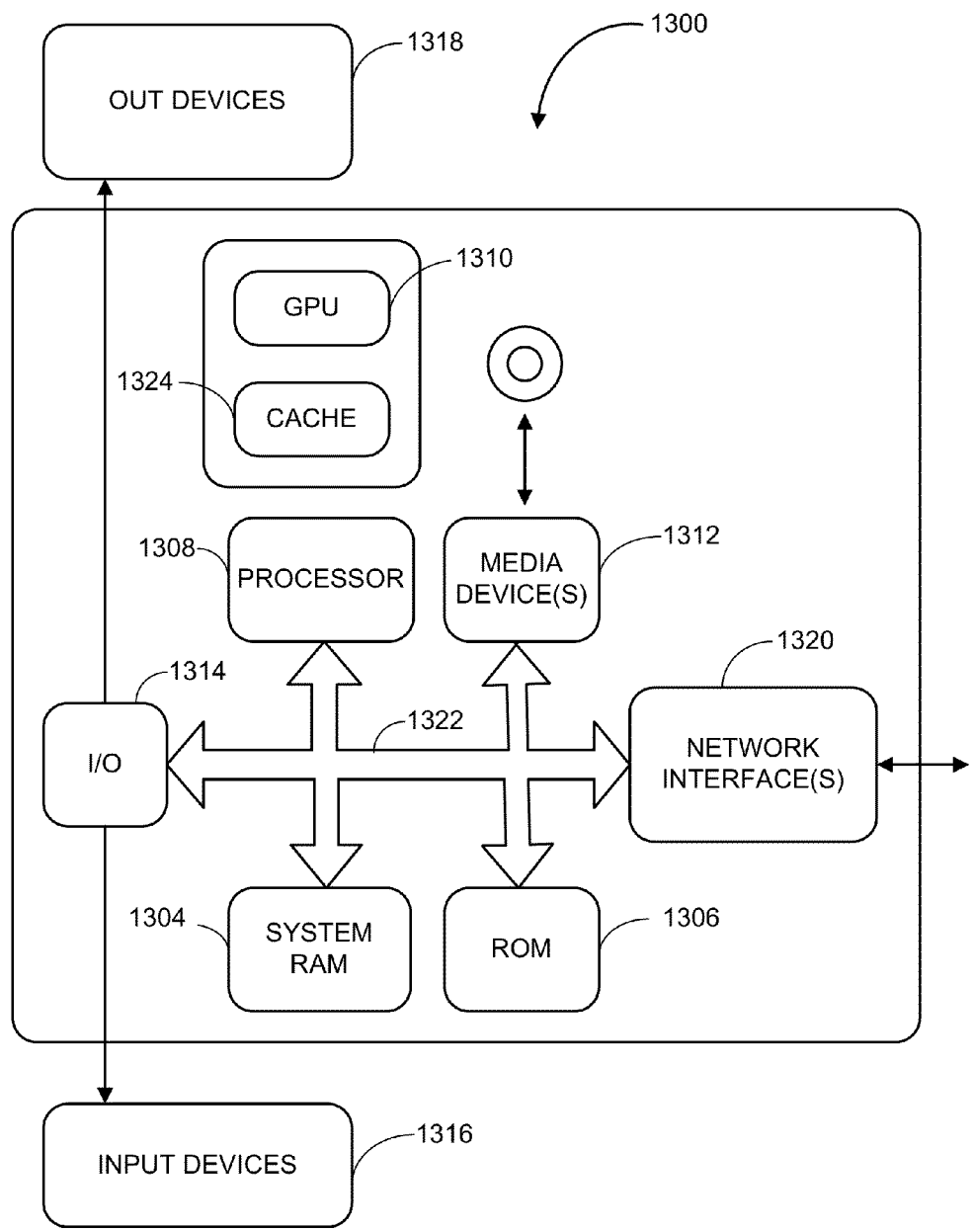
FIG. 13 illustrates a block diagram of a processing environment in accordance with implementations described herein.

FIG. 13 illustrates a block diagram of a processing environment 1300 in accordance with implementations described herein. The coding and decoding methods described above can be applied to many different kinds of processing environments. The processing environment 1300 may include a personal computer (PC), game console, and the like.

The processing environment 1300 may include various volatile and non-volatile memory, such as a RAM 1304 and read-only memory (ROM) 1306, as well as one or more central processing units (CPUs) 1308. The processing environment 1300 may also include one or more GPUs 1310. The GPU 1310 may include a texture cache 1324. Image processing tasks can be shared between the CPU 1308 and GPU 1310. In the context of the present disclosure, any of the decoding functions of the system 100 described in FIG. 1 may be allocated in any manner between the CPU 1308 and the GPU 1310. Similarly, any of the coding functions of the method 300 described in FIG. 3 may be allocated in any manner between the CPU 1308 and the GPU 1310.

The processing environment 1300 may also include various media devices 1312, such as a hard disk module, an optical disk module, and the like. For instance, one or more of the media devices 1312 can store the DXTn format textures 255, the intermediate format textures 235, and the storage format textures 215 on a disc.

The processing environment 1300 may also include an input/output module 1314 for receiving various inputs from the user (via input devices 1316), and for providing various outputs to the user (via output device 1318). The processing environment 1300 may also include one or more network interfaces 1320 for exchanging data with other devices via one or more communication conduits (e.g., networks). One or more communication buses 1322 may communicatively couple the above-described components together.

It should be understood that the various technologies described herein may be implemented in connection with hardware, software or a combination of both. Thus, various technologies, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computer, the machine becomes an apparatus for practicing the various technologies. In the case of program code execution on programmable computers, the computing device may include a processor, a storage medium readable by the processor (including volatile and non-volatile memory and/or storage elements), at least one input device, and at least one output device. One or more programs that may implement or utilize the various technologies described herein may use an application programming interface (API), reusable controls, and the like. Such programs may be implemented in a high level procedural or object oriented programming language to communicate with a computer system. However, the program(s) may be implemented in assembly or machine language, if desired. In any case, the language may be a compiled or interpreted language, and combined with hardware implementations.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A system for layered texture compression, comprising:
a texture cache used by a graphics processing unit (GPU) for texture mapping and containing a texture compressed in an index-based compression format, the texture compressed in the index-based compression format comprising color information and index information indexing the color information;
system memory, connected with the texture cache, containing the texture compressed in an intermediate compression format that is compressed on top of the index-based compression format, wherein the color information and the index information are compressed in the intermediate compression format;
a peripheral storage, connected with the system memory, containing the texture compressed in a storage compression format that is compressed on top of the intermediate compression format; and
the GPU processing the texture from the texture cache in the index-based compression format.

2. The system of claim 1, wherein the index-based compression format is a DirectX® Texture Compression format.

3. A method for layered texture compression, comprising:
compressing a texture into an intermediate compression format on top of an index-based compression format, the intermediate compression format including compression of color information and index information of the texture;
compressing the texture into a storage compression format on top of the intermediate compression format; and
compressing alpha-channel information using at least:
4×4 integer transform; or
quantization of transformation coefficients.

4. The method of claim 3, wherein compressing the texture into the intermediate compression format comprises:
compressing base-color information about the texture;
compressing color-index information about the texture; and
variable length entropy coding of the compressed base-color information and the compressed color-index information.

5. The method of claim 4, wherein compressing the base-color information comprises:
compressing the base-color information with a lossy compression method;
compressing the base-color information with a lossless compression method; and
selecting the compressed base-color information from the lossy compressed base-color information or the lossless compressed base-color information based on a sum of absolute difference the compressed base-color information and the base-color information.

6. The method of claim 4, wherein compressing the base-color information comprises using at least:
conversion of base-color information from red, green, and blue (RGB) colorspace to a luminance-chrominance (Y-UV) space;
Haar transformation;
4×4 integer transform; or
quantization of transformation coefficients.

7. The method of claim 4, wherein compressing the color-index information comprises:
re-mapping the color-index information to represent color-level progression between base-colors;
predicting the color-index information based on texel-based prediction methods;
sampling the predicted color-index information; and
run-length coding the sampled color-index information.

8. The method of claim 7, wherein predicting the color-index information comprises:
texel-based median prediction; and
texel-based directional prediction.

9. The method of claim 3, wherein compressing the alpha-channel information further comprises:
predicting alpha-index information based on texel-based prediction methods;
sampling the predicted alpha-index information; and
run-length coding the sampled alpha-index information.

10. A method for decompressing texture data, the method comprising:
accessing textures stored in system random access memory (RAM) of a system, the textures in the system RAM in an intermediate storage format that has been compressed on top of an index-based compression format, the system comprising: a graphics processor unit (GPU), the system RAM, non-volatile storage connected with the system RAM via a first decoder, and a texture cache connected with the GPU and connected with the system RAM via a second decoder, the non-volatile storage storing the textures in a storage compression format that has been compressed on top of the intermediate storage format;
decompressing the textures, by the first decoder, from the storage compression format into the intermediate compression format and storing the textures in the intermediate compression format in the system RAM; and
decompressing, by the second decoder, the textures from the system RAM into an index-based compression format from the intermediate compression format and storing the textures in the index-based compression format in the texture cache.

11. The method of claim 10, wherein decompressing the textures into the index-based compression format comprises, for a given texture:
decompressing base-color information about the given texture;
decompressing color-index information about the given texture; and
variable length entropy decoding of the base-color information and the color-index information.

12. The method of claim 11, wherein decompressing the base-color information comprises using at least:
dequantization of quantized transformation coefficients;
inverse Haar transformation;
inverse 4×4 integer transformation; or
conversion of base-color information from luminance-chrominance (Y-UV) space to a red, green, and blue (RGB) color-space.

13. The method of claim 11, wherein decompressing the color-index information comprises performing:
run-length decoding the color-index information;
determining sampled prediction errors based on the decoded color-index information;

predicting color-indices based on texel-based prediction methods;

modifying the predicted color-indices with the sampled prediction errors; and re-mapping the modified color-indices from a color-level progression representation to an original index representation.

14. The method of claim 11, further comprising decompressing alpha-channel information.

15. The method of claim 14, wherein decompressing the alpha-channel information comprises performing at least:

dequantization of quantized transformation coefficients;

inverse Haar transformation; or inverse 4×4 integer transformation.

16. The method of claim 14, wherein decompressing the alpha-channel information comprises:

run-length decoding the alpha-channel information;

determining sampled prediction errors based on the decoded alpha-channel information;

predicting alpha-indices based on texel-based prediction methods; and modifying the predicted alpha-indices with the sampled prediction errors.

\* \* \* \* \*